Patented Feb. 6, 1934

1,946,089

UNITED STATES PATENT OFFICE 1,946,089

ANHYDROUS SODIUM SULPHIDE AND PROCESS OF MAKING SAME

Henry Horace Mayers, Philadelphia, Pa., assignor to Rohm & Haas Company, a corporation of Delaware No Drawing. Application June 7, 1930
Serial No. 459,837

5 Claims. (Cl. 23—134)

This invention relates to a process of making anhydrous sodium sulphide and a new and novel product made thereby. This application is a continuation in part of Serial No. 369,929 filed June 10th, 1929.

Heretofore, sodium sulphide has been marketed as crystal ($Na_2S.9H_2O$), as concentrate about 60% $Na_2S$, this being in the form of chip, flake, pellets, broken up fused lumps, or solid fused drums, and anhydrous sodium sulphide such as would be obtained from high temperature furnacing processes, which is generally in the form of broken up fused lumps. Such anhydrous material generally contains a considerable amount of impurities from the reducing agents used in the furnacing process.

My product differs from the crystal and so-called concentrate forms of sodium sulphide in that it contains over 85% $Na_2S$, and is substantially free from water. My product differs from the known anhydrous forms of sodium sulphide in that it is free from insoluble materials that come from the reduction furnaces, and in that it is a granular form.

In my process for preparing granular anhydrous sodium sulphide, the temperatures used are comparatively low. This is possible because all the work is done in a partial vacuum. Agitation is necessary, and the sodium sulphide liquor is stirred during evaporation, crystallization of the anhydrous sulphide, and drying. A plow type agitator is used to prevent solidification and to enable evaporation to continue until the concentration reaches a figure of above 85%. All these steps are done in the same kettle.

My invention is a new and useful product, being an improvement over the other forms of sodium sulphide now manufactured and marketed, and offers the following advantages:

Firstly, it is a product that contains over 85% sodium sulphide ($Na_2S$), is practically water-free, and contains no insoluble impurities from the furnacing process. Secondly, it is granular and free running; thirdly, it occupies less than 65% of the volume occupied by an equal weight of chip or flake sodium sulphide concentrate; fourthly, it can be dissolved quickly in water of 25° C. (77° F.); whereas, an equivalent amount of sodium sulphide concentrate, chip or flake, requires water at 90° (194° F.) to effect solution in the same length of time.

Example

The vacuum kettle, which is essentially a vacuum crystallizer, is charged with about 450 pounds of sodium sulphide, either in solution, as crystals, or as concentrate, with sufficient water to make good contact with the sides of the vessel. The agitator or plow is then started, the kettle sealed, and vacuum applied. The temperature in the kettle is now raised by the circulation of steam at 75-80 pounds pressure through the outer jacket. If desired, the circulation of hot oil through this outer jacket of the kettle, direct firing, or any other suitable means of obtaining a temperature equivalent to that of 80 pounds' steam pressure, can be used. The material heated under the above condition is concentrated to a point where anhydrous crystals of $Na_2S$ start to form. By regulating the rate of boiling at this point, the size of particles in the finished material can be controlled. Speed of the agitator also determines the size of the finished material, to some extent. Due to the nature of this process, the type of agitator used is important and the blade or blades should fit closely to the bottom and sides of the kettle, pitched so as to plow through and turn over the crystal mass which, during part of its process, is almost dough-like in consistency. Heating is continued until the desired amount of water is removed from the sodium sulphide, when it is stopped and the material cooled before being discharged from the kettle.

Sodium sulphide dehydrated in this way contains little dust, and contains over 85% sodium sulphide ($Na_2S$). When a sufficiently pure original charge of sodium sulphide is used, it is possible to prepare a substantially anhydrous sodium sulphide, containing 96% $Na_2S$, with no added impurities resulting from the process other than a small amount of iron sulphide. Although I prefer to use sodium sulphide which contains only a small amount of salts present as impurities, if a product of lower purity than 96% is desired, sodium sulphide liquors containing such impurities as sodium sulphite, sodium sulphate, sodium thiosulphate, sodium hydrosulphide, sodium carbonate, and sodium silicate, can be substituted for sodium sulphide in the process described above. If it is desirable to make material which is from 94% to 96% sodium sulphide ($Na_2S$) from highly impure sodium sulphide liquors, these liquors may be purified by methods well known to those skilled in the art.

I claim:

1. A process for making granular anhydrous sodium sulphide which consists in heating hydrous sodium sulphide under reduced pressure and simultaneously stirring said mass by plowing and turning over the same.

2. A process of making granular anhydrous sodium sulphide which consists in heating at substantially 150° C. hydrous sodium sulphide and simultaneously stirring said mass by plowing and turning over the same.

3. As a new article of manufacture a new form of sodium sulphide which is granular and contains over 85% $Na_2S$.

4. As a new article of manufacture a new form of sodium sulphide which is granular, anhydrous, and contains over 85% $Na_2S$.

5. As a new article of manufacture a new form of sodium sulphide which is granular, anhydrous, substantially free from insoluble impurities and contain over 85% $Na_2S$.

HENRY HORACE MAYERS.